United States Patent [19]
McClain et al.

[11] 3,876,886

[45] Apr. 8, 1975

[54] UNIDIRECTIONAL POWER TRANSFER METHOD AND APPARATUS

[75] Inventors: James E. McClain; Howard L. Scott, both of Greenville, Tex.

[73] Assignee: Esco Manufacturing Company, Greenville, Tex.

[22] Filed: Aug. 1, 1973

[21] Appl. No.: 384,609

[52] U.S. Cl. .................................. 307/51; 317/43
[51] Int. Cl. ............................................ H02h 3/26
[58] Field of Search ......... 307/43, 85, 104, 116, 51; 317/7, 8, 9 R, 43, 28 R

[56] References Cited
UNITED STATES PATENTS

| | | | |
|---|---|---|---|
| 3,353,029 | 11/1967 | Rolfes | 307/51 |
| 3,396,310 | 8/1968 | Logan | 317/43 X |
| 3,453,495 | 7/1969 | Thomas | 307/51 X |

Primary Examiner—Robert K. Schaefer
Assistant Examiner—M. Ginsburg
Attorney, Agent, or Firm—Kenneth R. Glaser

[57] ABSTRACT

Disclosed are a method and apparatus for unidirectionally transferring alternating current power between input and output terminals by switchably inductively coupling the terminals under operating conditions indicative of forward power flow and decoupling same in anticipation of reverse power flow. The inductive switching is effected by transformer means responding to opening and closing command signals received from magnitude and phase comparators, which signals control the current supplied from a saturable reactor to a control winding of the transformer.

22 Claims, 3 Drawing Figures

UNIDIRECTIONAL POWER TRANSFER METHOD AND APPARATUS

The invention relates generally to electrical power distribution systems, more particularly to the protection of such power systems from undesired reverse power flow, and even more particularly to static switching apparatus for assuring unidirectional power transfer from supply voltage feeders to a load network.

There are many applications which require the unidirectional transfer of electrical power along an electrical transmission line. For example, in electrical power distribution systems, it is common to employ two or more high voltage sources to feed a common load network by way of conventional step-down distribution transformers. In certain instances, for example a loss of, or fault in, one of the sources, a power flow reversal can occur with power flowing from the load network toward the feeder, which eventually can result in the complete failure of the system. To prevent such undesirable occurrence, it is extremely important to disconnect that portion of the system experiencing reverse power flow. For this purpose a wide variety of network protectors incorporating reverse power flow detectors have been developed which are inserted intermediate each distribution transformer and the load network, which protectors are effective to disconnect the transformer from the load upon the occurrence of reverse power flow, and thus insure the desired unidirectional power transference.

The most common type of prior art reverse power flow network protectors are essentially mechanical switches which contacts are closed under normal operating conditions (supply voltage equal to or greater than, and not lagging, the load voltage) and which are opened in response to the reverse power flow. Various types of sensor arrangements are employed to detect these respective circuit conditions and effect the required switching, one of the earliest and most common types being in essence a disc type wattmeter which closes the switch contacts when rotated in one direction and opens the switch contacts when rotated in the opposite direction, the direction of rotation of the disc being a function of the direction of the power flow. More recent developments have resulted in the provision of electrical or electromechanical sensors for opening and closing the switch contacts.

In practice, however, while these prior art protectors have generally served the purpose for which they are intended, there are several serious drawbacks associated with their use. For instance, the mechanical nature of the switch itself results in apparatus which is not only bulky and expensive to build, but also involving constant and costly maintenance. Furthermore, the interruption of several thousand amperes of reverse current caused undesirable arcing between the contacts, enhancing the possibility of equipment damage and failure. Additionally, these prior art devices generally have undesirably slow response times between the sensing of the power reversal and the disconnection in response thereto.

In an attempt to overcome some of these disadvantages, more recent developments have been directed to the use of an all electronic or static network protector or interrupter, eliminating mechanical or electromechanical components from both the switch and the sensor relays for operating the switch. While such apparatus theoretically can reduce some of the problems previously discussed, they are not entirely satisfactory for all conditions or service and have not been successfully commercially employed. Among the problems still remaining even with this type of apparatus is the inability to handle, or unidirectionally transfer, large values of current or power, as well as the inability to respond to the power reversal in sufficient time to avoid a system failure.

It is therefore a principal object of the present invention to provide a new and improved method and apparatus for the unidirectional transfer of alternating current electrical power.

It is another object of the invention to provide, in a power distribution system of the type including a plurality of supply voltages feeding a common load network, improved apparatus for assuring transfer of electrical power only in the direction from the voltage supplies to the load network.

It is another object of the invention to provide a static power transfer switch in an electrical distribution system responsive to reverse power flow conditions.

It is an even further object of the invention to provide a unidirectional power switch to replace prior art mechanical and electromechanical switches, which switch results in improved response times, greater reliability, improved current carrying capacities, and reductions in construction and maintenance costs.

In accordance with these and other objects, the present invention is directed to the unidirectional transfer of electrical power by way of apparatus which switchably, inductively couples the AC power source to the load under operating conditions indicative of forward power flow and decouples the source from the load in response to, or in anticipation of, reverse power flow. Rather than utilizing a separate network interrupter for isolating the distribution transformer from the load network, as previously described, the apparatus of the present invention utilizes sensor networks responsive to the source and load voltage and current conditions for controlling the inductive coupling and decoupling of power within the distribution transformer itself, thus allowing an essentially instantaneous decoupling of the load from the source upon the occurrence of power reversal.

In a preferred embodiment of the invention, for each phase of a polyphase electrical distribution system, a single phase transformer is coupled between the high voltage feeders and the low voltage load lines and includes a winding for inductively coupling the feeder with the low voltage lines when the current through this coupling winding is maximized and preventing such coupling when the current therethrough is reduced. The regulation of the current through this coupling winding is controlled as a function of the output from a saturable reactor which, in turn, is regulated by a control network responsive to "opening" and "closing" signals derived from sensor networks indicating the input and output voltage and current conditions (magnitude and phase) in the system. These sensor networks generate a "closing" command signal when the supply voltage is not less than, nor lagging, the load network voltage; and an "open" command signal when the phase relationship between the load voltage and load current indicate the occurrence of reverse power flow. The transformer therefore not only provides the conventional means for transferring power from the feeders to the load, but itself functions as a magnetic switch which is closed during normal operating conditions, and is opened in response to power reversal, thus assuring the unidirectional power transfer from the source to the load.

Additional features of the invention, as well as further objects and advantages thereof, will become apparent from the following detailed description taken in conjunction with the accompanying drawings wherein like reference numerals refer to corresponding components and wherein.

Figure 1:
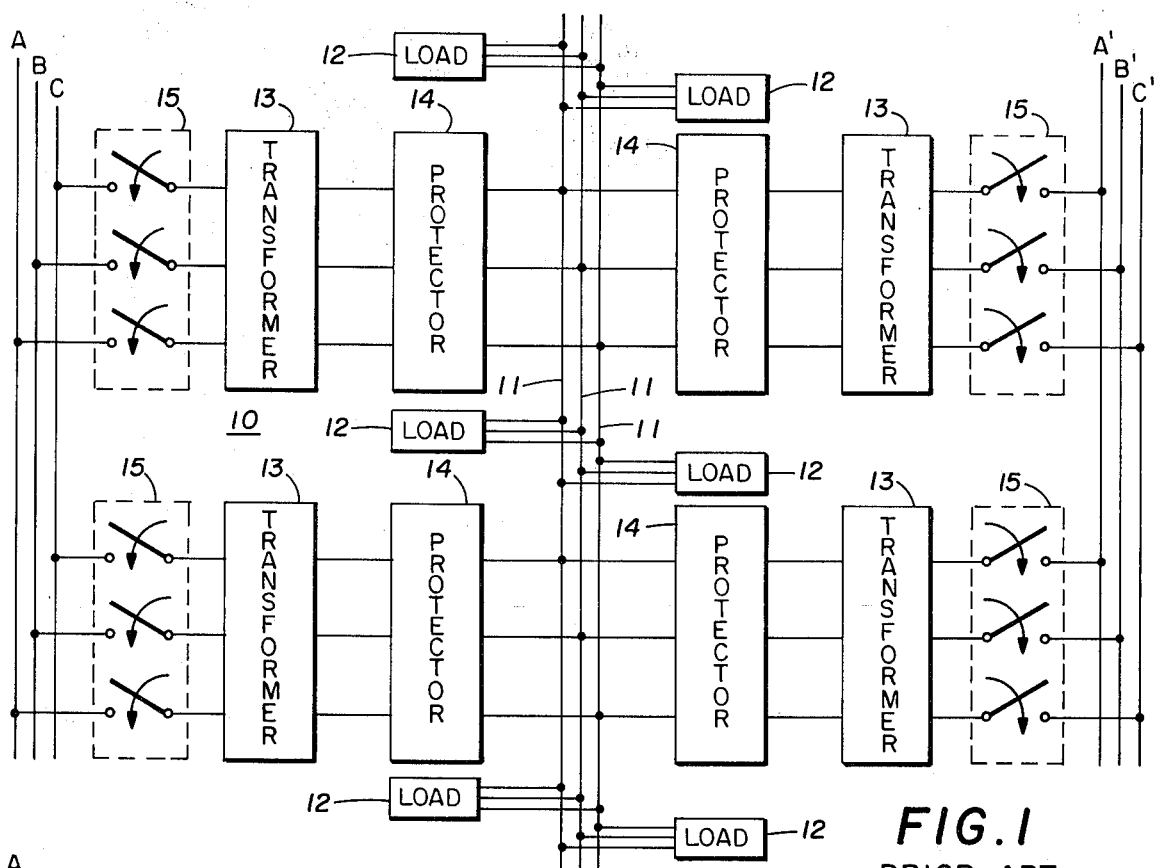
FIG. 1 is a block diagram schematic of a power distribution system employing a reverse power flow protective network in accordance with the prior art.

Referring initially to FIG. 1, a power distribution system 10 utilizing a network protective scheme in accordance with the prior art is illustrated. Accordingly, first and second sets of high voltage feeders A, B, and C, and A', B', and C' provide respective three phase preferred and emergency sources, these voltage sources being coupled to low voltage lines 11 by way of conventional circuit breakers 15 and step-down distribution transformers 13. Coupled to the secondary of the transformers 13 are network protectors 14 which are essentially switches which are closed during normal operation (power flow from feeder to load), and are adapted to respectively open and isolate the associated transformer 13 from the load lines 11 upon the occurrence of a power reversal within that branch (power flowing from the load lines 11 toward the transformer). It is significant to note that in accordance with this conventional prior art approach, each network protector 14 (which is ordinarily of mechanical or electromechanical configuration) is separate from its associated transformer 13, and is adapted to isolate the transformer only after the occurrence of a power reversal.

Figure 2:
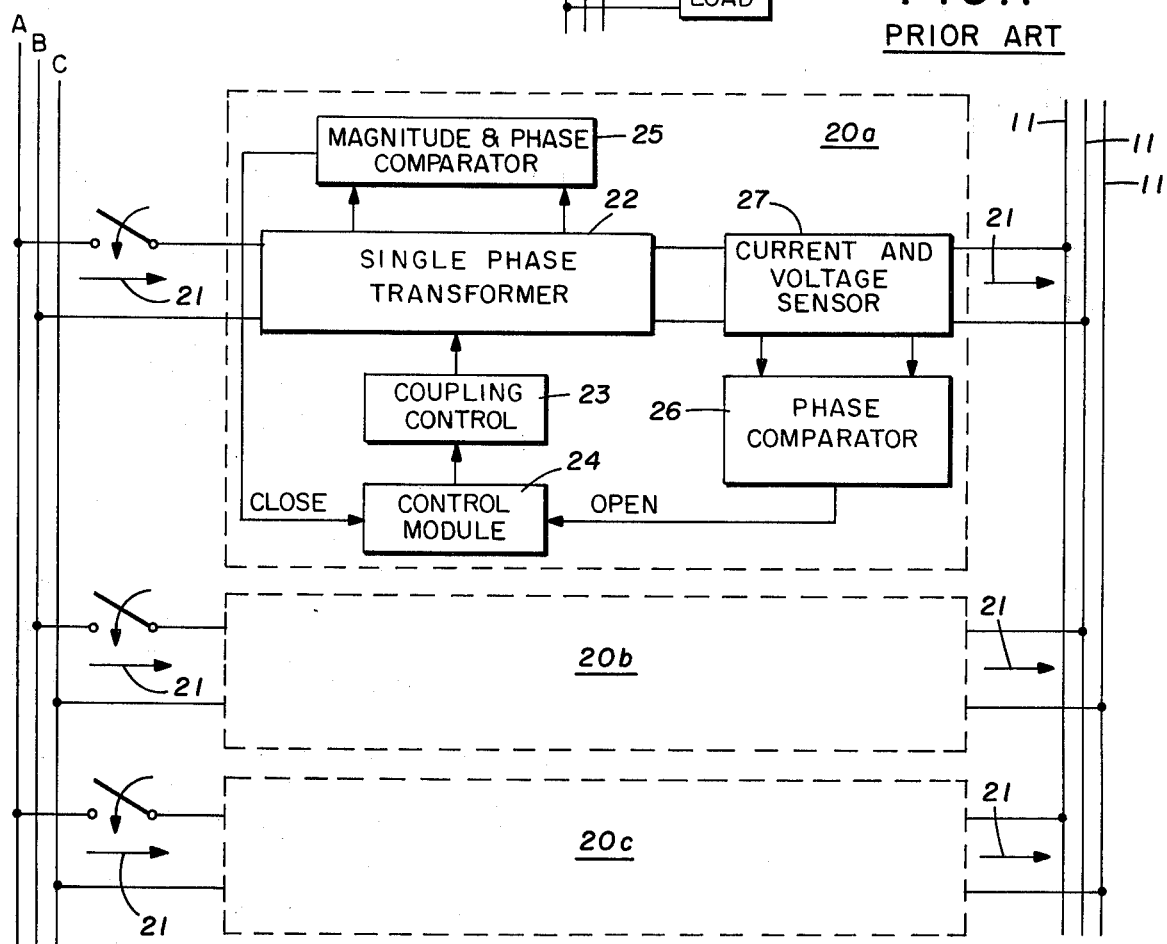
FIG. 2 is a block diagram schematic of a power distribution system incorporating the unidirectional power transfer system in accordance with the principles of the present invention.

Referring now to FIG. 2, a three phase power distribution network incorporating the approach of the present invention for assuring unidirectional power transfer is depicted. Accordingly, respectively associated with each phase, and coupled between the voltage feeders A, B, and C, and the low voltage load lines 11, are unidirectional power transfer systems 20a, 20b, and 20c for assuring the unidirectional flow of power therebetween in the direction indicated by arrows 21. For convenience, the following description is referenced to the power transfer system 20a, it being understood that the description and operation of the systems 20b and 20c are identical thereto.

At the heart of the system 20a is single phase transformer means 22 for alternatively inductively coupling the high voltage supply feeders A–B to the corresponding load lines during normal operating conditions to enable the desired forward power flow, and decoupling same upon the occurrence of, or in anticipation of, a power reversal therebetween. This coupling or decoupling is effected under the control of means 23 which itself is controlled by the output from control module 24. The coupling within the transformer 22 is effected in response to the receipt of a "close" command signal from magnitude and phase comparator means 25 which generates such signal only when: (1) the supply voltage is equal to or greater than the load voltage, and (2) the supply voltage is in phase with or leading the load voltage, these two conditions indicating when power will flow in the desired forward direction. The decoupling is effected in response to an "open" command signal derived from phase comparator means 26 (coupled to load current and voltage sensor means 27) which generates such signal when the phase relationship between the load current and load voltage indicates the imminence or occurrence of reverse power flow.

It is significant to note that, as a unique feature of the present invention, the transformer 22 thus not only serves the conventional function of inductively transferring the power to the load, in the same manner as transformer 13 in FIG. 1, but also functions as a switch or network protector by interrupting the transmission path in the event of the power reversal to prevent power transfer between the load and the feeder.

Figure 3:
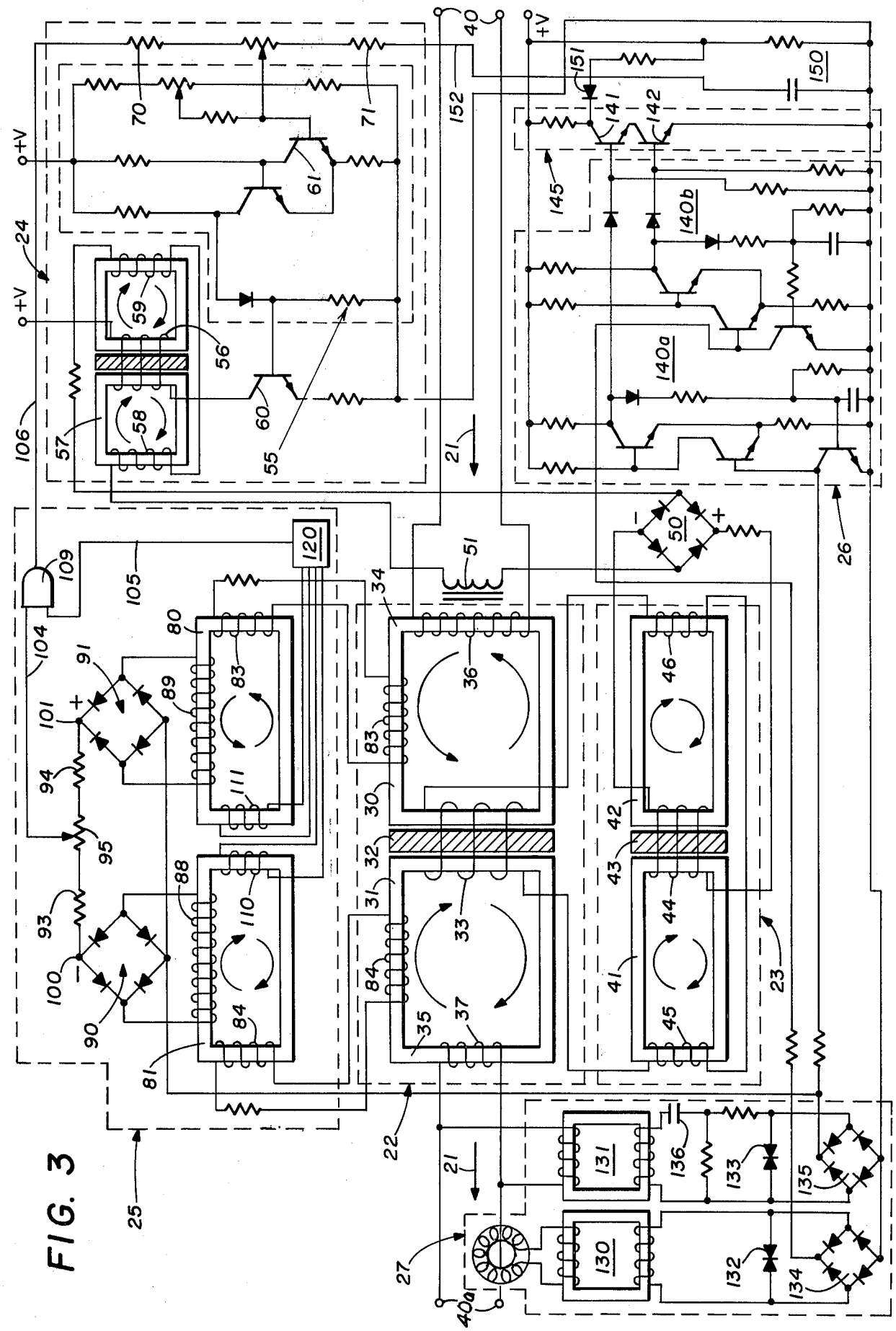
FIG. 3 is a detailed schematic diagram of the unidirectional power transfer system broadly depicted in FIG. 2.

Referring now to FIG. 3, the system 20a is more specifically described. Single phase transformer 22 comprises a pair of magnetic cores 30 and 31 separated by a spacer 32 of nonmagnetic material. Respectively disposed around legs 34 and 35 of cores 30 and 31 are primary and secondary windings 36 and 37. In accordance with conventional practice, the primary and secondary windings 36 and 37 would have the desired turns ratio to effect the required step-down of the high input voltage (from feeders A-B) appearing across the input terminals 40 to the low voltage delivered at the output terminals 40a (coupled to the load lines 11).

In accordance with a unique feature of the present invention, winding 33 is disposed around and couples cores 30 and 31, maximization of current therethrough inductively coupling the primary and secondary, while reduction in this current results in the decoupling of same. Thus, the transformer 22 essentially acts as a magnetic switch which, when "closed" (input [primary winding 36] and output [secondary winding 37] coupled), allows power transfer between the input and output terminals and, when "opened," (primary and secondary decoupled) prevents such transfer. As previously indicated, the switch is "closed" only under source and load voltage magnitude and phase conditions which would result in forward power flow in direction of arrows 21; and is "opened" under load voltage and current conditions indicative of reverse power flow.

The regulation of the current magnitude in coupling coil 33 is effected by coupling control means 23 which, in accordance with a preferred embodiment of the invention, is provided by a saturable reactor comprising a pair of magnetic cores 41 and 42 separated by a spacer 43 of nonmagnetic material, a DC control winding 44, and a pair of load windings 45 and 46 in series with one another, and with coupling winding 33.

The construction and operation of a saturable reactor, also commonly referred to as a magnetic amplifier, is well known in the art, it being sufficient for the purposes of the present invention to point out that the permeability of the magnetic cores is altered by fluctuations in current through the DC control winding. Thus, the application of a sufficiently large DC voltage to the control coil 44 saturates the cores, reducing the AC impedance of the load windings 45 and 46 to a minimum, thereby maximizing the circulating current through the winding 33. Conversely, when the DC voltage to the control coil 44 drops below a predetermined minimum value, the resulting increase in the AC impedance of the load windings 45 and 46 substantially reduces the current through winding 33 below that necessary to provide coupling through transformer 22.

The DC voltage to the control winding 44 is supplied from the output of a full wave rectifier bridge 50, which inputs are coupled to power supply winding 51 and variable impedance control network 24. Specifically, the control network 24 comprises a bistable trigger network 55 coupled to transistor 60, the output of which is coupled to one end of control winding 56 of saturable reactor 57. The reactor load windings 58 and 59 are connected in series with one another and with winding 51, the three windings then being coupled across the input terminals to the bridge rectifier 50.

When a positive signal of at least a minimum magnitude is applied to the base input of the transistor 61 of the trigger network 55, the resulting output signal from network 55 triggers transistor 60 into conduction, impressing a maximum DC voltage across the control winding 56, and thereby reducing the impedance of the load windings 58 and 59. As a consequence, a maximum voltage appears across the input to the bridge network 50, resulting in maximum DC voltage across the control winding 44 of the saturable reactor 23. Conversely, when the input to the transistor 61 is below this minimum level, the transistor 60 is not conducting, the DC voltage to the control winding 56 is low, and the AC impedance of the load windings 58 and 59 is at a maximum. This then results in a minimum voltage being applied to the control winding 44 of the reactor 23. It can thus be seen that the "closing" of the switch provided by the transformer 22 (thus effecting the desired coupling) occurs as a consequence of a signal of sufficient positive magnitude or level being provided at the input of the control module 24; and the "opening" (or decoupling) is effected in response to the signal input falling below this minimum level.

In accordance with a unique feature of the present invention, the positive "closing" command signal is generated by magnitude and phase comparator 25 and supplied (by way of resistor 70) to the input of the trigger network 55; and the "opening" command is generated by way of a negative signal from the output of a phase comparator network 26 and supplied (by way of the resistor 71) to the input of the network 55.

The magnitude and phase comparator network 25 comprises a pair of transformer cores 80 and 81 respectively inductively coupled to cores 30 and 31 of transformer 22 by way of paired winding sets 83 and 84. Additionally, a pair of windings 88 and 89 are respectively coupled from the cores 81 and 80 to the input terminals of full wave rectifiers 90 and 91, the negative output terminal 100 of rectifier 90 coupled to the positive output terminal 101 of rectifier 91 by way of resistors 93 and 94 and potentiometer 95. Thus, the value of the negative voltage at the terminal 100 is proportional to the output or load voltage at terminals 40a, while the value of the positive signal at the terminal 101 is proportional to the input or source voltage at terminals 40. Preferably, the resistors 93 and 94 are of identical value, and by properly adjusting or calibrating the potentiometer 95, a positive signal can be made to only occur at the output lead 104 when the source voltage has a magnitude equal to or greater than the load voltage.

Additionally, a pair of windings 110 and 111 disposed around respective legs of the cores 81 and 80 are coupled to the input of a phase comparator 120, the winding 110 providing an AC signal having a phase corresponding to the phase of the load voltage at terminals 40a; and the winding 111 providing an AC signal having a phase corresponding to the phase of the input or source voltage at terminals 40. The construction and operation of the phase comparator 120 can be in accordance with any network known in the art which is effective to produce a positive signal at the output 105 only when the source voltage is in phase with, or leading, the load voltage.

The outputs 104 and 105 can then be coupled to the input to a conventional AND gate 109 which produces the positive "closing" command signal (at the output 106) only when positive signals simultaneously appear at the inputs thereof. Thus, a positive signal of the required level is applied to the input of the network 55 only when the source voltage is equal to or greater than, and not lagging, the load voltage.

As previously described, the "opening" command signal is generated from the output of a phase comparator 26 in the form of a negative signal which is supplied to the trigger network 55. This negative signal is produced as a consequence of the load voltage and load current approaching a phase relationship (phase difference in excess of 90°) indicative of power reversal.

While various network arrangements may be utilized to accomplish this objective, a preferred form thereof is depicted in FIG. 3. Accordingly, current and voltage sensor means 27 for producing first and second sets of pulsed output signals respectively representative of the load current and load voltage at output terminals 40a is coupled between the output terminals and a phase comparator 26 which generates the negative command signal when the phase relationship of the output signals from sensor 27 indicates the imminence of a power reversal.

Specifically, sensor means 27 comprises a current transformer 130 and a voltage transformer 131 for respectively sensing the load current and the load voltage at the output of main transformer means 22. The output of the current transformer 130, along with clipping diodes 132, is coupled across the input of full wave rectifier 134; while the output from voltage transformer 131, along with clipping diodes 133, is coupled across the input of full wave rectifier 135, a capacitor 136 being connected in the voltage sensing portion to introduce a 90° lead to the signals inputted to rectifier bridge 135.

Phase comparator 26 comprises a pair of Schmitt triggers 140a and 140b having their inputs respectively coupled to the outputs of rectifiers 134 and 135; an AND gate 145 comprising transistors 141 and 142 having their base inputs respectively connected to the outputs from triggers 140a and 140b; and pulse integrator means 150 coupled by way of diode 151 to the output from AND gate 145. The output from the phase comparator is then coupled by lead 152 through resistor 71 to the input of trigger 55, diode 151 assuring that the output signal from comparator 26, when generated, is negative.

AND gate 145 is effective to generate the negative output signal to the trigger network 55 only when pulses are simultaneously present at the base inputs of both transistors 141 and 142. Due to the capacitor 136, when the load current and load voltage at the output of transformer 22 are in phase, the train of output pulses from full wave rectifier 135 is phase shifted approximately 90° from the train of output pulses from full wave rectifier 134. Consequently, for this condition, the time displacement between the pulses respectively applied to transistors 141 and 142 will be at a maximum.

As the phase difference between the load voltage and load current approaches 90°, the time displacement of the pulses respectively applied to transistors 141 and 142 will correspondingly become less until portions of the pulse widths respectively outputted from Schmitt triggers 140a and 140b overlap, resulting in the simultaneous presence of trigger signals at the pair of inputs to AND gate 145, thereby generating the negative "opening" command signal therefrom. In accordance with a unique feature of the present invention, this overlapping will occur just prior to power reversal, i.e., just prior to the phase difference between the load current and load voltage exceeding 90° (at approximately 85°-90°, for example). Thus, the "opening" command signal is actually generated to control module 24 in anticipation of, rather than after, reverse power flow.

There is now described the overall operation of the power transfer system 20a. Initially, during normal operating conditions when power is set to flow from the supply feeders A-B (coupled to input terminals 40) through the transformer 22 to the low voltage load lines 11 (coupled to output terminals 40a), the supply voltage at the input terminals 40 will exceed (or may be equal to) the load voltage at the output terminal 40a; and the supply voltage will be in phase with or be leading the load voltage.

As a consequence, positive signals (respectively representing the desired relative magnitude and phase relationships of the supply and load voltages) will be generated by way of leads 104 and 105 to the AND gate 109, thus generating the "closing" command signal to the control module 24 which, in accordance with the previous description, activates coupling control 23 for maximizing current through coupling coil 33 and inductively coupling the primary and secondary windings 36 and 37. As a consequence, the switch provided by transformer 22 is "closed;" and power is transferred in the direction of the arrows 21.

Upon the occurrence of a fault or other system condition which would produce reverse power flow through transformer 22, the load voltage and current will quickly approach a phase difference exceeding 90°. These output load conditions are sensed, in the manner previously described, by the current and voltage sensor 27, activating the phase comparator 26 to generate the "opening" command signal to the control module 24, resulting in the decoupling of transformer 22 windings 36 and 37 to prevent the reverse power transferral.

In accordance with another unique feature of the present invention, the system 20a is effective to immediately "open" the transformer switch 22 upon the loss of supply voltage at input terminals 40. This is due to the fact that the input power to the rectifier 50 is derived from the winding 51 inductively coupled to primary winding 36 of transformer 22. Thus, upon loss of voltage across primary winding 36, the DC voltage supplied to control winding drops below that necessary to maintain the required current through winding 33 of transformer 22.

Thus, it is seen that the apparatus of the present invention provides unidirectional power transfer means which involves no mechanical or moving parts, is capable of handling large values of current, is essentially instantaneous in responding to power reversals, and minimizes both construction and maintenance costs.

Various other modifications may be made to the disclosed embodiment of the invention, as well as alternate embodiments may be provided, without departing from the spirit and the scope of the invention as defined by the appended claims.

What is claimed is:

1. In an alternating current power distribution system of the type including supply voltage feeders, a load network and unidirectional power transfer means for permitting power to be transferred from said supply voltage feeders to said load network and for preventing power being transferred from said load network toward said feeders; the improvement wherein said unidirectional power transfer means comprises:
   a. transformer means electrically connected between said supply voltage feeders and said load network and adapted to be switched between a first and second state, the transformer means when in said first state coupling by induction said supply voltage feeders and said load network, the transformer means when in said second state essentially electrically isolating said supply voltage feeders from said load network; and
   b. control means coupled to said transformer means for switching said transformer means to said first state when the supply voltage from said supply voltage feeders is not less than, nor lagging, the load voltage of said load network, and switching said transformer means to said second state when the difference between the phase of the load voltage and the phase of the load current of said load network exceeds a predetermined amount.

2. The improvement as defined by claim 1 wherein said predetermined amount is approximately 90°.

3. The improvement as defined by claim 1 wherein said control means comprises:
   a. first means for sensing the magnitude and phase of said supply voltage and said load voltage and generating a closing command signal for effecting said switching of said transformer means to said first state when the supply voltage is not less than, nor lagging, the load voltage; and
   b. second means coupled to said load network for generating an opening command signal for effecting said switching of said transformer means to said second state in anticipation of the difference between the phase of the load voltage and the phase of the load current exceeding 90°.

4. The improvement as defined by claim 3 wherein said transformer means includes primary and secondary windings and control winding means for inductively coupling said primary winding with said secondary winding when current through said control winding means is above a predetermined minimum value and for preventing such coupling when the current through such control winding means is below said predetermined minimum value.

5. The improvement as defined by claim 4 wherein said control means further comprises coupling control means coupled to said control winding means for regulating the extent of current through said control winding means.

6. The improvement as defined by claim 5 wherein said coupling control means is a saturable reactor.

7. The improvement as defined by claim 6 wherein said coupling control means increases the current above said predetermined minimum value through said control winding means upon the generation of said closing command signal from said first means and reduces the current through said control winding means below said predetermined minimum value upon the generation of said opening command signal from said second means.

8. The improvement as defined by claim 7 wherein said first means comprises a magnitude comparator for generating a first output signal when the supply voltage is equal to, or greater than, the load voltage; a phase comparator for generating a second output signal when the phase of the supply voltage is equal to, or leading, the phase of the load voltage; and signal generating means for generating said closing command signal upon the simultaneous occurrence of said first and second output signals.

9. The improvement as defined by claim 7 wherein said second means comprises sensing means for generating a pair of output signals respectively representative of phase of the load voltage and load current and phase comparator means coupled to said sensing means for generating the said opening command signal when said pair of output signals indicate a phase relationship therebetween approaching, but less than 90°.

10. Apparatus for assuring the unidirectional transfer of alternating current power between input and output terminals having respective voltages thereacross, a load being disposed at said output terminals, said apparatus comprising:
   a. magnetic switching means, when closed, for inductively coupling said power between said input and output terminals and, when opened, for preventing said coupling;
   b. first means coupled to said input and output terminals for generating a closing command signal for closing said magnetic switching means when the voltage across said input terminals is not less than, nor lagging, the voltage across said output terminals; and
   c. second means coupled to said output terminals for generating an opening command signal for opening said magnetic switching means in response to the difference between the phase of the voltage and the phase of the current of the load at said output terminals approaching 90°.

11. The apparatus as defined by claim 10 wherein said magnetic switching means comprises transformer means having primary and secondary windings respectively coupled to the input and output terminals and control winding means for inductively coupling said primary winding with said secondary winding when current through said control winding means is above a predetermined minimum value and for preventing such coupling when the current through such control winding means is below said predetermined minimum value.

12. The apparatus as defined by claim 11 further including third means having inputs respectively coupled to said first and second means and an output coupled to said control winding means for regulating the extent of current through said control winding means.

13. The apparatus as defined by claim 12 wherein said third means includes a saturable reactor.

14. The apparatus as defined by claim 12 wherein said third means increases the current above said predetermined minimum value through said control winding means upon the generation of said closing command signal from said first means and reduces the current through said control winding means below said predetermined minimum value upon the generation of said opening command signal from said second means.

15. The apparatus as defined by claim 14 wherein said third means includes a saturable reactor.

16. The apparatus as defined by claim 10 wherein said first means comprises a magnitude comparator for generating a first output signal when the voltage across said input terminals is equal to, or greater than, the voltage at said output terminals; a phase comparator for generating a second output signal when the phase of the voltage at said input terminals is equal to, or leading, the phase of the voltage at said output terminals; and signal generating means for generating said closing command signal upon the simultaneous occurrence of said first and second output signals.

17. The apparatus as defined by claim 10 wherein said second means comprises sensing means for generating a pair of output signals respectively representative of phase of the voltage and current at said output terminals and phase comparator means coupled to said sensing means for generating the said opening command signal when said pair of output signals indicate a phase relationship therebetween approaching 90°.

18. The apparatus as defined by claim 14 wherein said first means comprises a magnitude comparator for generating a first output signal when the voltage across said input terminals is equal to, or greater than, the voltage at said output terminals; a phase comparator for generating a second output signal when the phase of the voltage at said input terminals is equal to, or leading, the phase of the voltage at said output terminals; and signal generating means for generating said closing command signal upon the simultaneous occurrence of said first and second output signals.

19. The apparatus as defined by claim 14 wherein said second means comprises sensing means for generating a pair of output signals respectively representative of phase of the voltage and current at said output terminals and phase comparator means coupled to said sensing means for generating the said opening command signal when said pair of output signals indicate a phase relationship therebetween approaching 90°.

20. A method for assuring the unidirectional transfer of alternating current power by switchable inductive coupling between input and output terminals, comprising the steps of:
   a. initially coupling by induction the power between said terminals only when the voltage across said input terminals is not less than, nor lagging, the voltage across said output terminals; and
   b. thereafter interrupting said coupling in anticipation of the difference between the phase of the voltage and the phase of the current at said output terminals exceeding 90°.

21. Magnetic switching apparatus for assuring the unidirectional transfer of alternating current power between input and output terminals, a load network being disposed at said output terminals, said apparatus comprising:

a. transformer means having primary and secondary windings respectively connected with said input and output terminals and a control winding means for inductively coupling said primary winding with said secondary winding when current through said control winding means is above a predetermined minimum value and for preventing such coupling when the current through such control winding means is below said predetermined minimum value;

b. first means for comparing the magnitude and phase of the voltage across said input terminals with the magnitude and phase of the voltage across said output terminals and generating a first command signal for increasing the current through said control winding means above said predetermined minimum value when said so-compared magnitude and phase indicates that said alternating current power will flow from said input terminals toward said output terminals, thereby to couple said input and output terminals; and c. second means for comparing the phase of the current through said load network with the phase of the voltage across said output terminals and generating a second command signal for reducing the current through said control winding below said predetermined minimum value when the phase relationship between the load current and the voltage across said output terminals indicates that said alternating current power will flow from said output terminals toward said input terminals, thereby to effectively electrically isolate said input terminals from said output terminals to prevent such power flow from said output terminals toward said input terminals.

22. The apparatus as defined by claim 1 wherein said first command signal is generated when the voltage across said input terminals is not less than, and leading, the voltage across said output terminals; and wherein said second command signal is generated when the difference between the phase of the voltage across said output terminals and the phase of said load current is approximately 90°.

* * * * *